(12) United States Patent
Iwata et al.

(10) Patent No.: US 7,523,735 B2
(45) Date of Patent: Apr. 28, 2009

(54) MULTIPLE-CYLINDER ENGINE FOR OUTBOARD MOTOR

(75) Inventors: Yoshibumi Iwata, Shizuoka-ken (JP); Kentaro Kameoka, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 154 days.

(21) Appl. No.: 11/645,983

(22) Filed: Dec. 27, 2006

(65) Prior Publication Data

US 2007/0240410 A1   Oct. 18, 2007

(30) Foreign Application Priority Data

Apr. 17, 2006  (JP) .............................. 2006-113229

(51) Int. Cl.
*F01N 1/00* (2006.01)

(52) U.S. Cl. .................. 123/195 P; 60/322; 440/89 C; 440/89 J (58) Field of Classification Search ............. 123/65 PE, 123/65 EM, 195 P; 440/88 J, 89 J, 89 C; 60/322
See application file for complete search history.

(56) References Cited

U.S. PATENT DOCUMENTS

| | | | |
|---|---|---|---|
| 3,967,446 A | | 7/1976 | Harralson et al. |
| 4,034,561 A | * | 7/1977 | Sakurai et al. ................. 60/282 |
| 5,374,209 A | * | 12/1994 | Wagner ..................... 440/89 J |
| 5,487,688 A | | 1/1996 | Sumigawa |
| 6,471,559 B2 | * | 10/2002 | Kashima ................... 440/88 G |
| 2005/0260900 A1 | | 11/2005 | Nakata et al. |
| 2008/0026654 A1 | * | 1/2008 | Konakawa et al. ......... 440/89 J |

FOREIGN PATENT DOCUMENTS

| | | | |
|---|---|---|---|
| JP | 09-049425 | | 2/1997 |
| JP | 2000-303818 | | 10/2000 |
| JP | 2007-283894 | * | 11/2007 |

OTHER PUBLICATIONS

Co-Pending U.S. Appl. No. 11/617,528, filed Dec. 18, 2006. Title: Idle Exhaust Structure for Outboard Motor. Inventors: Kameoka et al.

* cited by examiner

*Primary Examiner*—Hai H Huynh
(74) *Attorney, Agent, or Firm*—Knobbe, Martens, Olson & Bear, LLP (57) ABSTRACT

An engine body of the multiple-cylinder engine for an outboard motor can include a crankcase for supporting a crankshaft whose axis extends vertically, and plural cylinders that are vertically arranged in line, each cylinder horizontally extending outward from the crankcase, and each cylinder having a respective exhaust port formed in a cylinder head. There are can be provided plural exhaust passages, each passage extending from the downstream end of the exhaust port, each passage communicating with the exhaust port and expansion chambers. Each expansion chamber can communicate with the extending end of the exhaust passage.

17 Claims, 7 Drawing Sheets

Figure 7

MULTIPLE-CYLINDER ENGINE FOR OUTBOARD MOTOR

PRIORITY INFORMATION

This application is based on and claims priority to Japanese Patent Application No. 2006-113229, filed Apr. 17, 2006, the entire contents of which is hereby expressly incorporated by reference.

BACKGROUND OF THE INVENTIONS

1. Field of the Inventions

The present inventions relate to multiple-cylinder engines for outboard motors, and more particularly, the exhaust systems of such engines.

2. Description of the Related Art

A conventional multiple-cylinder engine for an outboard motor is disclosed in Japanese Patent Document JP-A-Hei 9-49425. According to this Patent Document, an engine body of the engine includes a crankcase for supporting a crankshaft which has a vertical axis and plural cylinders that are vertically arranged, each cylinder horizontally extending outwardly from the crankcase. An exhaust port is formed for each cylinder in the cylinder head. Plural exhaust passages are formed, each of which extend from a downstream end of the respective exhaust port.

The downstream ends of the exhaust passages extending from the respective cylinders are joined to each other to form plural, joined-flow exhaust passages. The ignition order of these cylinders is not sequential. The downstream ends of these exhaust passages are joined to each other and then pass through expansion chambers and then to the atmosphere.

While the engine is operating, exhaust gas from each cylinder passes through the exhaust passages and flows into the joined flow exhaust passage. In this case, as previously noted, the ignition order of the cylinders which feed exhaust gas into the exhaust passages in communication with one joined flow exhaust passage, is not sequential. Thus, the timings at which exhaust gas is emitted from the cylinders differ from each other. This prevents exhaust gas from the cylinders from interfering with each other in the joined flow exhaust passage, resulting in excellent exhaust efficiency.

After that, the exhaust gas from the cylinders is joined to each other at the downstream ends of the joined flow exhaust passages, then passes through the expansion chamber to be muffled, and is discharged to the atmosphere.

SUMMARY OF THE INVENTION

As described above, according to the related art, exhaust gas from the cylinders is prevented from being interfered with each other. This results in excellent exhaust efficiency and exhaust gas muffling effect. However, an aspect of at least one of the inventions disclosed herein includes the realization that such exhaust passages which can be joined in two stages, can be unnecessarily long in overall length. As such, such systems can require an unnecessarily large space, and therefore the size of the engine is larger than necessary, which results in a complicated structure of the engine.

Thus in accordance with at least one embodiment, a multiple-cylinder engine for an outboard motor can comprise an engine body, and a crankcase supporting a generally vertically extending crankshaft. A plurality of cylinders of the engine can be arranged generally vertically, each cylinder extending horizontally outward from the crankcase, and each cylinder having a respective exhaust port formed in a cylinder head. A plurality of exhaust passages can also be provided, each passage extending from the downstream end of the exhaust port, and wherein each passage communicating with the exhaust port. Additionally, the engine can include a plurality of expansion chambers, each expansion chamber communicating with the extending end of the exhaust passage.

In accordance with at least another embodiment, a multiple-cylinder engine for an outboard motor can comprise an engine body, a crankcase supporting a generally vertically extending crankshaft, and a plurality of cylinders arranged generally vertically, each cylinder extending horizontally outward from the crankcase, and each cylinder having a respective exhaust port formed in a cylinder head. The engine can also include a plurality of exhaust passages, at least a portion of each passage extending generally horizontally at a position downstream from the downstream end of the exhaust port, each passage communicating with the exhaust port. Additionally, a plurality of expansion chambers can communicate with the extending end of a plurality of the exhaust passages.

BRIEF DESCRIPTION OF THE DRAWINGS

The above-mentioned and other features of the inventions disclosed herein are described below with reference to the drawings of the preferred embodiments. The illustrated embodiments are intended to illustrate, but not to limit the inventions. The drawings contain the following Figures.

DETAILED DESCRIPTION OF THE PREFERRED EMBODIMENT

Improved exhaust systems for an engine 11 (FIG. 1) are disclosed herein. Although the present exhaust systems are illustrated and described in the context of an outboard motor, certain aspects of the present inventions can be used with engines of other types of vehicles, as well as with other types of prime movers.

Figure 2:
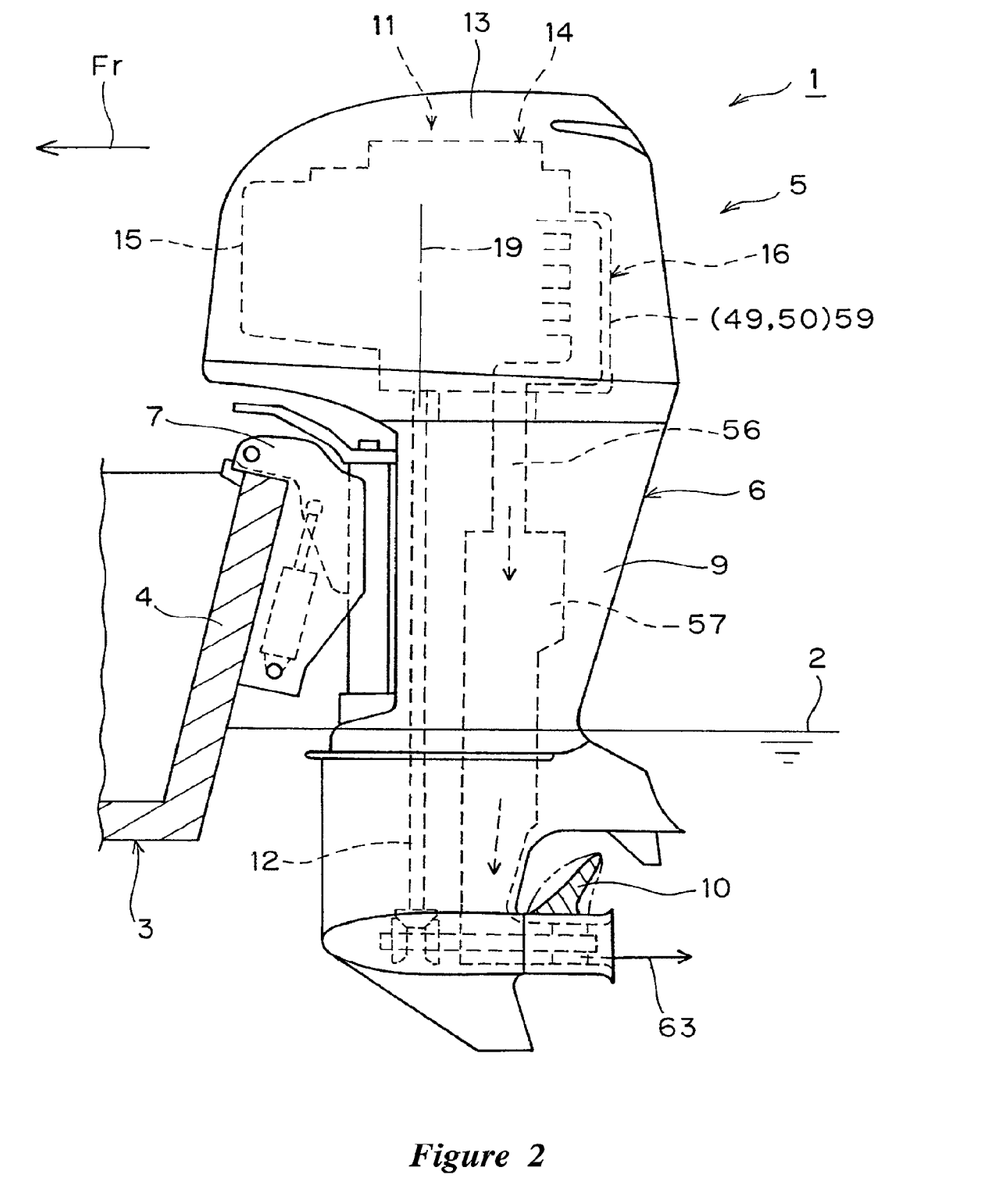
FIG. 2 is a schematic side elevational view of an outboard motor which can include the engine of FIG. 1.

In FIG. 2, reference numeral 1 denotes a watercraft floating on the surface of the water 2. The arrow Fr indicates the forward direction in which the watercraft 1 can travel.

The watercraft 1 can have a hull 3, and an outboard motor 5 supported by a stern 4 of the hull 3. The outboard motor 5, which can be located rearwardly of the hull 3, can include an outboard motor body 6 for producing propulsive force to allow the hull 3 to travel, and a bracket 7 for supporting the outboard motor body 6 detachably from the stern 4.

The outboard motor body 6 can include a case 9 with its upper part supported to the stern 4 with the bracket 7 and its lower part immersed in the water 2. A propeller 10 can be supported at the lower end of the case 9. An engine 11 can be supported at the upper end of the case 9. A power transmission mechanism 12 can be housed within the case 9 and can be configured to allow the propeller 10 to be connected to and operative in conjunction with the engine 11. Additionally, a cowling 13, which can be opened and closed, can cover the engine 11 and thus protect it. However, other configurations can also be used.

Figure 1:
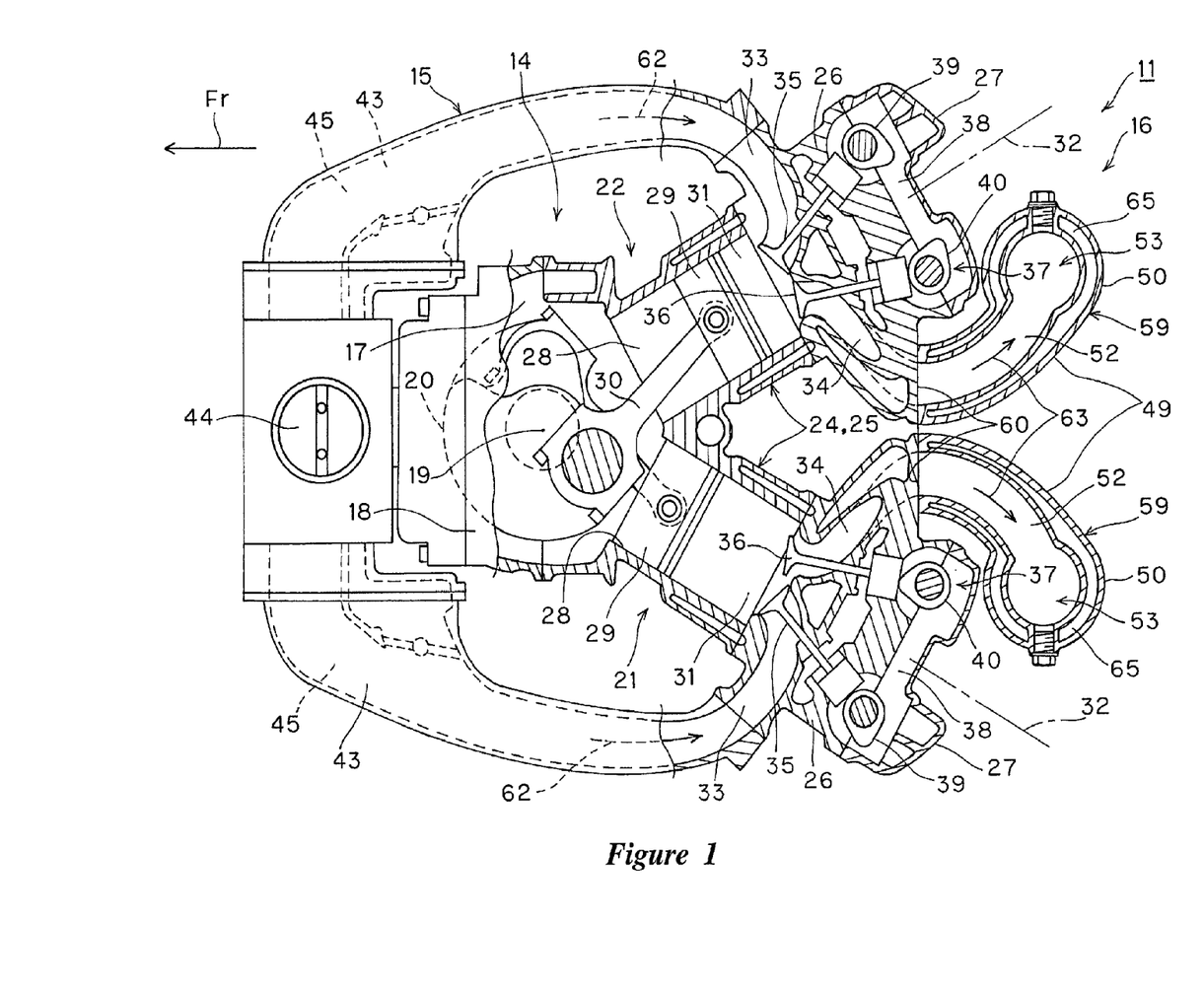
FIG. 1 is top plan and partial sectional view of an engine according to a first embodiment, the engine having two cylinder banks.
Figure 3:
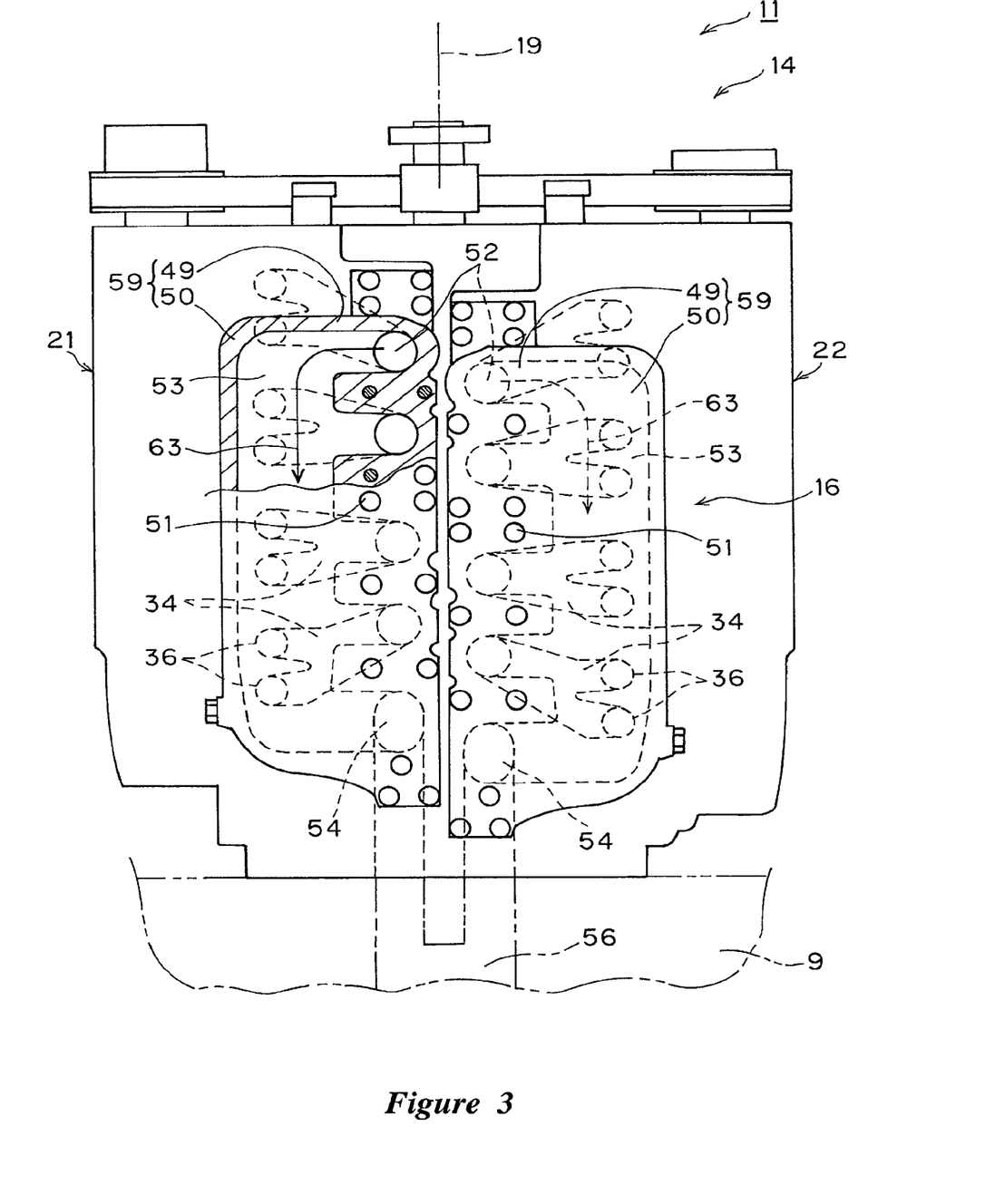
FIG. 3 is a rear elevational and partial sectional view of the engine of FIG. 1.

In FIGS. 1 to 3, the engine 11 is a four-stroke, V-shaped, multiple-cylinder engine. The engine 11 can include an engine body 14 supported on the upper side of the case 9, an intake system 15, and an exhaust system 16. Those skilled in the art, however, readily appreciate that the present exhaust systems can be used with any of a variety of engines having other numbers of cylinders, and/or other cylinder arrangements.

The engine body 14 can include a crankcase 18 supported on the upper side of the case 9 and having an internal space or a crank chamber 17. A crankshaft 20 can be supported in the crankcase 18 for rotation about an axis 19 extending vertically. Additionally, left and right cylinder banks 21, 22 can extend generally horizontally outwardly toward the rear of the engine 11 from the crankcase 18 and can extend into "V" shape, in plan view (FIG. 3).

Each bank 21, 22 can include plural (four) cylinders 24 arranged in line in the vertical direction. For example, each bank 21, 22 can include a cylinder block 25 protruding rearwardly from the crankcase 18, a cylinder head 26 mounted to the protruding end of the cylinder block 25, a cylinder head cover 27 mounted on the protruding end face of the cylinder head 26, and a piston 29 fitted into each of plural (four) cylinder holes 28 formed in the cylinder block 25 such that the piston can slide in the axial direction. A connecting rod 30 can connect the crankshaft 20 and the piston 29 to be operative in conjunction with each other.

Within the cylinder hole or "bore" 28, a space can be defined between the cylinder head 26 and the piton 29, so as to serve as a combustion chamber 31. Each cylinder 24 can be formed with several parts, including the cylinder block 25 that has one cylinder hole 28, and the cylinder head 26 and the cylinder head cover 27 that both correspond to the cylinder block 25.

The cylinder head 26 can have an intake port 33 and an exhaust port 34 for each cylinder 24, which are designed to communicate the combustion chamber 31 and external locations of the cylinder head 26 with each other. Intake and exhaust valves 35, 36 can be provided to open/close each of the intake ports 33 and exhaust ports 34, respectively. A valve actuating device 37 can be provided to move the intake valves 35 and the exhaust valves 36 between their open and closed positions, in conjunction with rotation of the crankshaft 20. An upstream end of the intake ports 33 can be formed on each outer side of the banks 21, 22. In contrast, a downstream end of the exhaust ports 34 can be formed on each oppositely-facing side of the banks 21, 22.

The valve actuating device 37 can be provided with an intake cam shaft 39 and an exhaust cam shaft 40, which are both located in a cam chamber 38 defined by between the cylinder head 26 and the cylinder head cover 27. The intake camshaft 39 and the exhaust camshaft 40 can be supported on the cylinder head 26 so as to rotate about an axis generally parallel to the axis 19 of the crankshaft 20. The intake camshaft 39 and the exhaust camshaft 40 can be in a cam engagement with the intake valves 35 and the exhaust valves 36, respectively. As noted above, the intake camshaft 39 and the exhaust camshaft 40 can be operative in conjunction with the crankshaft 20 to open and close the intake valves 35 and the exhaust valves 36 as appropriate.

The intake system 15 can be provided with intake pipes 43 for each bank 21, 22. The intake pipes 43 can extend forwardly from the cylinder heads 26 of the engine body 14. A throttle valve 44 can be mounted to the forwardly extending ends of the intake pipes 43. An internal space of each intake pipe 43 can be adapted to be an intake passage 45 for communicating the atmosphere with the intake port 33 through the throttle valve 44.

The exhaust system 16 can be provided with, for each bank 21, 22, exhaust pipes 49, which can extend rearwardly from the cylinder heads 26 of the engine body 14. Expansion chamber cases 50 can be formed integrally with the respective extending ends of the exhaust pipes 49. Fasteners 51 can be used for fastening or coupling the exhaust pipes 49 to the cylinder heads 26.

The exhaust pipe 49 can have an exhaust passage 52 that extends from the downstream end of the exhaust port 34 to be in communication with the exhaust port 34. Within the expansion chamber cases 50, an expansion chamber 53 having a large capacity can be in communication with the extending end of the exhaust passage 52. In this case, the expansion chamber 53 is formed adjacent to the cylinder 24 (in a plan view of the outboard motor 5 as in FIG. 1). An exhaust opening 54 (FIG. 3) is designed to open an inner bottom or a downstream end of the expansion chamber 53 toward an external location of the expansion chamber case 50 or the cylinder head 26. The exhaust opening is formed at the lower part of the expansion chamber case 50.

In an internal space between the lower end of the cylinder head 26 of the engine body 14 and the case 9, an additional exhaust passage 56 is formed with its one end communicating with the exhaust opening 54 of the expansion chamber 53 for each bank 21, 22, and with its other end extending further down the engine 11 to be open under the water 2 at the lower end of the case 9. In addition, an additional expansion chamber 57 is formed in the midsection of the additional exhaust passage 56.

An integral article 59, including the exhaust pipe 49 and the expansion chamber case 50, is provided separate from the cylinder head 26. A pair of mating faces 60 of the cylinder head 26 and the integral article 59 can have a downstream end opening of the exhaust port 34. An upstream end opening of the exhaust passage 52 can be in communication with the downstream end opening. The exhaust opening 54 can provide communication of the expansion chamber 53 with the external location of the integral article 59. An upstream end opening of the additional exhaust passage 56 formed in the cylinder head 26 can be in communication with the exhaust opening 54.

Optionally, each mating face 60 individually can create a single continuous flat plane. A seal member (not shown) can be interposed between the pair of mating faces 60.

In a plan view (FIG. 1) of the outboard motor 5, at least part of the exhaust passage 52 and the expansion chamber 53 (a proximal end of the exhaust passage 52 in the illustrated embodiment) can be located between the banks 21, 22. The exhaust passages 52 and the expansion chambers 53 can be entirely located between the axes 32 of the cylinder holes 28 of the respective banks 21, 22.

Each exhaust passage 52 can be bent into an arc shape, so as to extend along the external face of the cylinder head cover 27, that is, the protruding end of the cylinder 24. For example, the exhaust passages 52 can be bent such that they extend toward the opposite sides in a lateral direction of the outboard motor 5. Each expansion chamber 53 can be located adjacent to the rear of the protruding end of the cylinder 24. The lengths of all the exhaust passages 52 can be approximately equal to each other.

While the engine 11 is driven, atmospheric air 62 is drawn through the throttle valve 44, the intake passage 45, the intake port 33, and into the cylinder hole 28 in which the air 62 mixed with fuel is burnt. The combustion gas thus burnt or "exhaust gas" 63 passes through the exhaust port 34, the exhaust passage 52, the expansion chamber 53, the exhaust opening 54, the additional exhaust passage 56 and the additional expansion chamber 57 to be discharged into the water 2 through an exhaust discharge (not shown) below the water line, or any other exhaust discharge. The power generated by the combustion process is transmitted from the crankshaft 20 through the power transmission mechanism 12 to the propeller 10 so that the watercraft 1 is propelled across the body of water in which the watercraft 1 is floating. Additionally, reference numeral 65 denotes a coolant jacket.

According to the aforementioned structure, there are provided plural exhaust passages 52, each passage extending from the downstream end of the exhaust port 34, each passage communicating with the exhaust port 34, as well as expansion chambers 53, each expansion chamber communicating with the extending end of the exhaust passage 52.

This arrangement avoids the exhaust passages 52 from joining to each other, while allowing the exhaust passages to be communicated with the respective expansion chambers 53. As such, exhaust gas 63 passing through the exhaust passages 52 are kept apart and thus do not interfere with each other, resulting in excellent exhaust efficiency. The exhaust gas 63 passing through each exhaust passage 52 flows into the expansion chamber 53, which provides an excellent muffling effect.

The exhaust passage 52 can be limited such that it is only long enough to communicate the exhaust port 34 in the cylinder head 26 with the expansion chamber 53. Thus, the size of the engine 11 may be reduced, and accordingly, the size of the cowling 13 for covering the engine 11 may be reduced, resulting in downsizing of the outboard motor 5. The exhaust passages 52 of simple shapes are not joined to each other at any portion, thereby simplifying the structure of the engine 11.

As previously noted, the expansion chamber 53 can be formed adjacent to each cylinder 24 in a plan view (FIG. 1) of the outboard motor 5. As such, the cylinder 24 and the expansion chamber 53 can be placed more closely to each other, which can reduce the size of the engine 11. The length of the exhaust passage 52 can optionally be limited to a length sufficiently long to communicate the exhaust port 34 formed in the cylinder head 26 of the cylinder 24 with the expansion chamber 53. Thus, the structure of the engine 11 can be simplified.

As previously noted, in a plan view (FIG. 1) of the outboard motor 5, the engine 11 is a V-engine having the paired banks 21, 22, in which the exhaust passages 52 and the expansion chambers 53 are both at least partly located between the paired banks 21, 22, while being both wholly located between the axes 32 of the respective cylinder holes 28 of the paired banks 21, 22.

This allows a space, which is defined between the paired banks 21, 22, to be efficiently used for arranging the exhaust passages 52 and the expansion chambers 53. Concurrently, the paired banks 21, 22, the exhaust passages 52, and the expansion chambers 53 can be located close to each other. Therefore, the size of the engine 11 may be reduced.

As previously noted, the exhaust pipe 49, which forms the exhaust passage 52, and the expansion chamber case 50, which forms the expansion chamber 53, can be made integrally with each other. This integral unit 59, including the exhaust pipe 49 and the expansion chamber 50, can be provided separate from the cylinder head 26 and can be mounted to the cylinder head 26.

This allows the exhaust pipe 49 and the expansion chamber case 50 to be formed into a desired shape independent of the shape or size of the cylinder head 26, compared to the case where the cylinder head 26, the exhaust pipe 49, and the expansion chamber case 50 are formed into a single unit.

If a component, such as a knock sensor, is assembled between the paired banks 21, 22, this assembly process can be performed prior to mounting the integral article 59 to the cylinder head 26 of each bank 21, 22. This prevents a worker from being interfered with by the integral article 59 in the assembly process, so that the worker can easily perform the process.

As described above, in a plan view (FIG. 1) of the outboard motor 5, the exhaust passage 52 can be bent so as to extend along the external face of the cylinder head cover 27 or the protruding end of the cylinder 24. This can prevent the exhaust passage 52 from excessively protruding outward from the cylinder 24, and therefore can reduce the size of the engine 11.

In addition, as described above, because the exhaust passage 52 can be bent, the size of the engine 11 can be decreased, whereas the length of the exhaust passage 52 may increase. This enhances a scavenging effect due to a negative pressure created by exhaust pulsation or other effects, thereby improving the engine power output.

As previously noted, a pair of mating faces 60 of the cylinder head 26 and the integral article 59 can include a downstream end opening of the exhaust port 34 and an upstream end opening of the exhaust passage 52 in communication with the downstream end opening of the exhaust port 34. The exhaust opening 54 can provide communication between the expansion chamber 53 and the external location of the integral article 59. An upstream end opening of the additional exhaust passage 56 formed in the cylinder head 26 can be in communication with the exhaust opening 54. Each mating face 60 can create a flat plane.

Thus, the mating faces 60, on which openings of the passages 34, 52, 53, 56 can be formed, can be formed without a step in the plane direction, so that the mating faces 60 of the cylinder head 26 and the integral article 59 may be joined to each other precisely. This improves sealability between the mating faces 60.

FIGS. 4 to 7 illustrate modifications to the engine 11 described above. The components, functions and effects of these modifications are similar in many respects to those described above with reference to FIGS. 1-3. Therefore, those parts corresponding to the components in the above engine 11 are identified with the same reference numerals in the drawings and their description is not repeated, however, their differences are mainly described below. The structures of the parts of these modifications may be combined in various ways in the light of the present disclosure.

Figure 4:
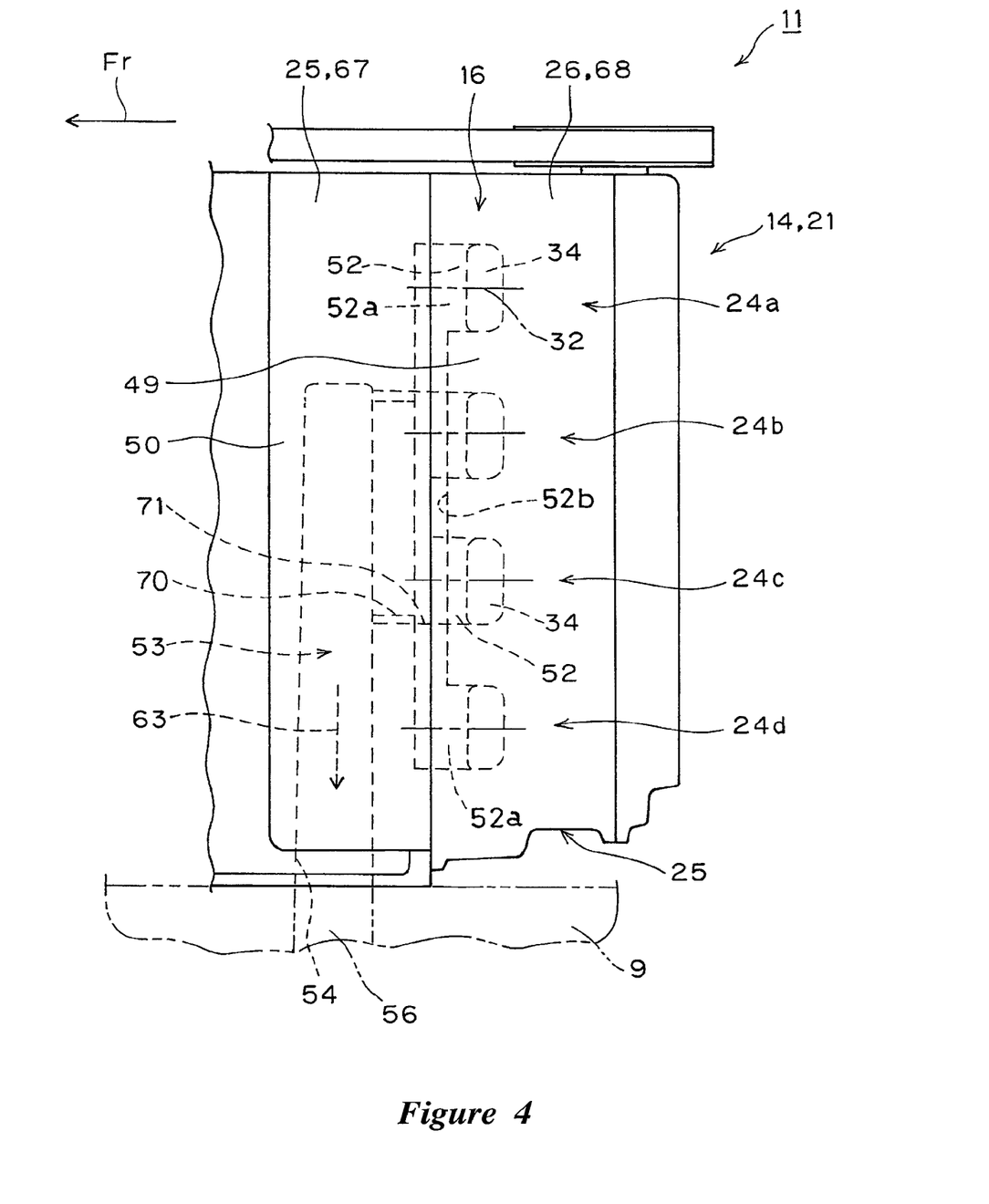
FIG. 4 is an enlarged side elevational view of a cylinder bank of a modification of the engine of FIG. 1.
Figure 5:
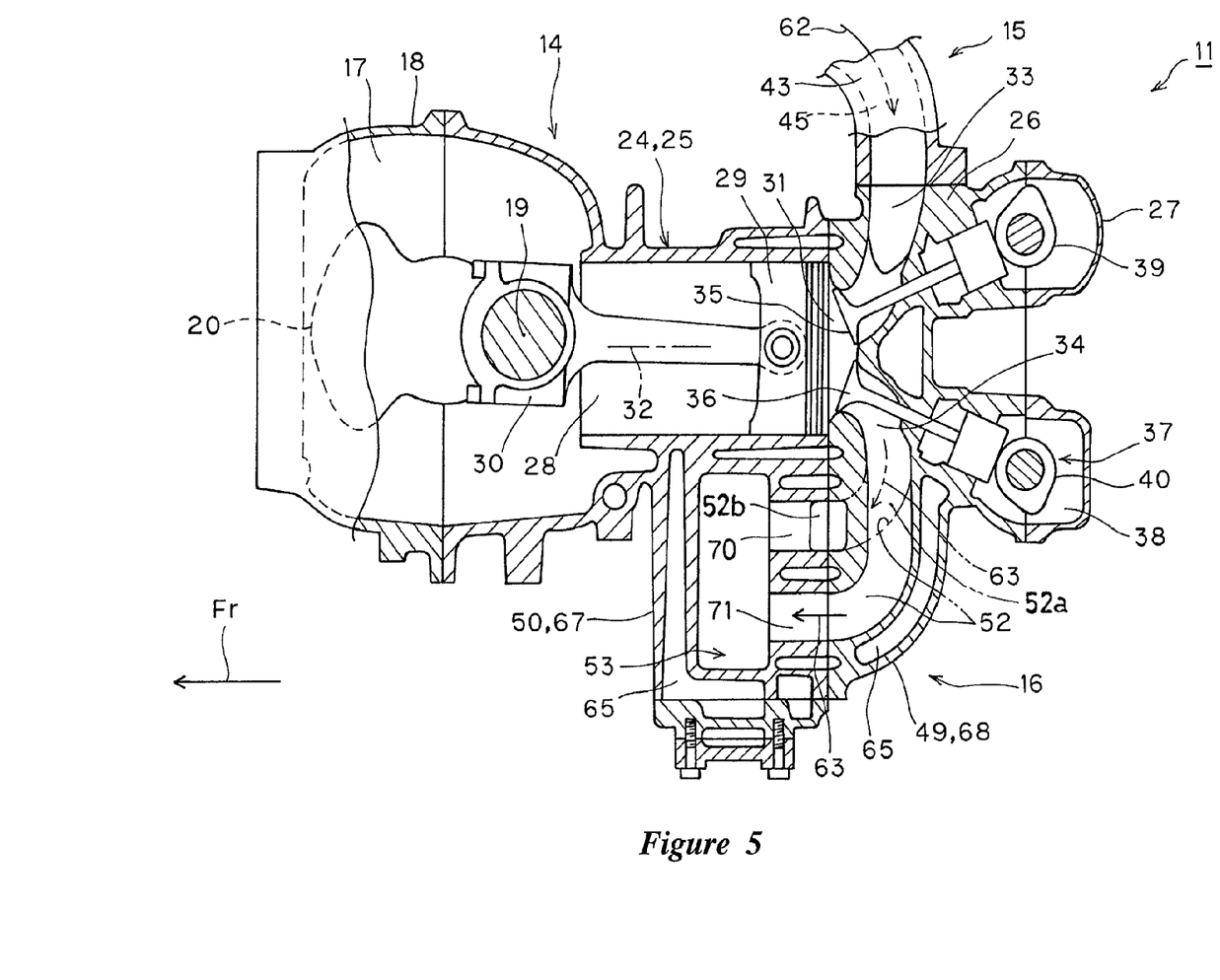
FIG. 5 is an enlarged top plan and partial sectional view of the engine of FIG. 4.
Figure 6:
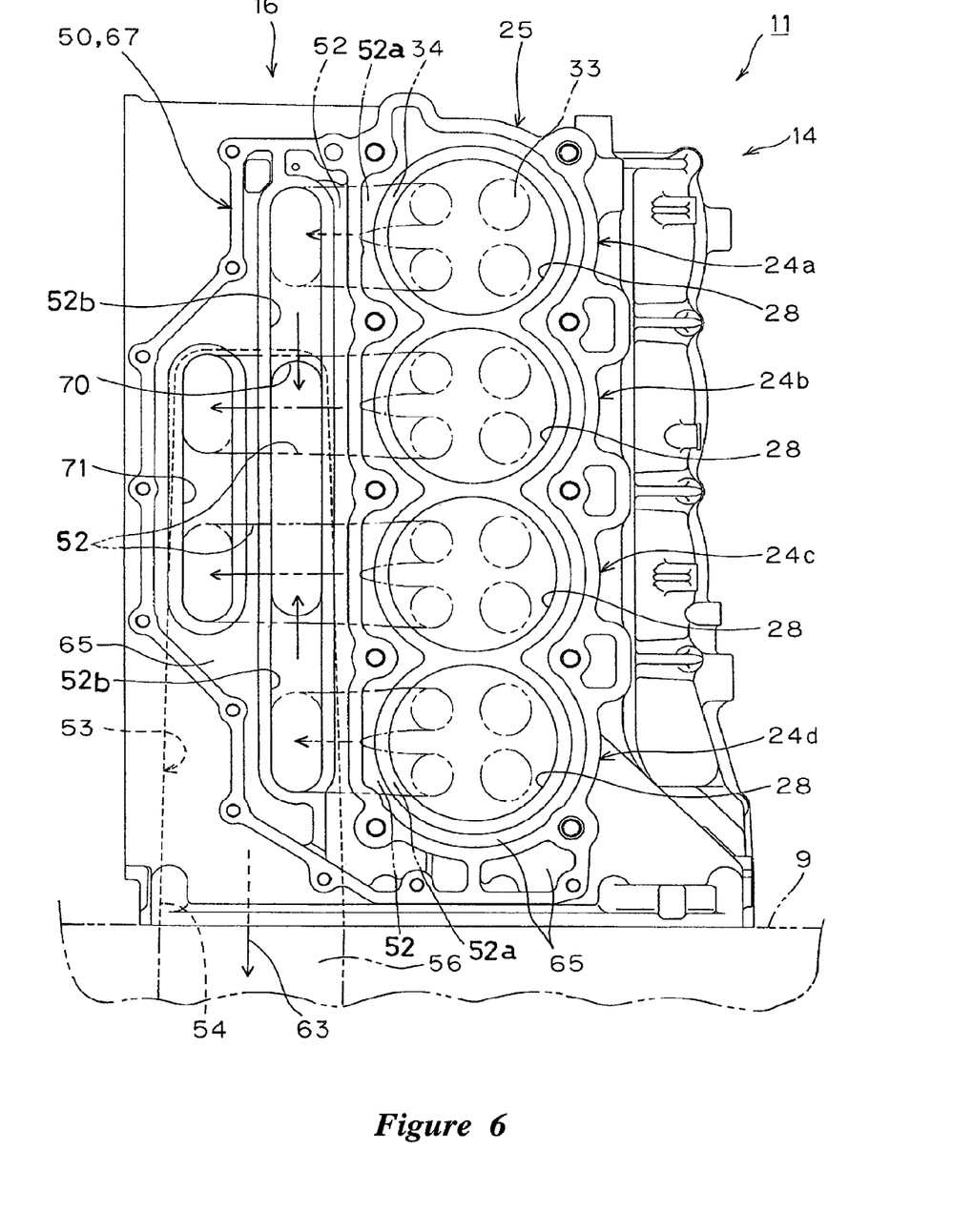
FIG. 6 is a rear elevational view of the engine of FIG. 4, with a cylinder head removed and with some of the internal passages that would be provided by the cylinder head illustrated in phantom line.

In FIGS. 4 to 6, the engine 11 is a multiple-cylinder engine having plural (even number) cylinders 24, including first to fourth cylinders 24a to 24d, arranged from the top to bottom of the engine body 14. However, any of a variety of engines having other numbers of cylinders, and/or other cylinder arrangements can also be used.

The cylinder block 25 and the cylinder head 26, both forming the cylinders 24a to 24d of the engine body 14, can partly extend outwardly in the horizontal direction to respectively define extending portions 67, 68. These extending portions 67, 68 can be joined to each other on a plane extending from the flat mating faces between the cylinder block 25 and the cylinder head 26.

The exhaust passages 52 can be formed in the extending portions 67, 68. The extending portion 67 of the cylinder block 25 can have the expansion chamber 53. In other words, the extending portion 67 of the cylinder block 25 can be adapted to be an expansion chamber case 50 formed integrally with the cylinder block 25.

The ignition order of the first cylinder 24a to fourth cylinder 24d can be, for example but without limitation, the first cylinder 24a, the third cylinder 24c, the fourth cylinder 24d, and the second cylinder 24b. A first and a second joined flow passage 70, 71 can be designed to join the respective downstream ends of the cylinders 24 to each other, in this example, cylinders 24 whose ignition order is not sequential. These joined flow passages can be formed in the extending portion 67 of the cylinder block 25. In addition, the downstream end side of the first and the second joined flow passages 70, 71 can communicate with the expansion chamber 53.

For example, each upstream side 52a of the exhaust passages 52 of the first and fourth cylinders 24a, 24d can be formed in the extending portion 68 of the cylinder head 26. Each downstream side 52b of the exhaust passages 52 of the first and fourth cylinders 24a, 24d can be formed between the mating faces of the extending portions 67, 68. The downstream ends of the exhaust passages extend vertically so as to oppositely face each other, so that the downstream ends are joined with the first joined flow passage 70. In contrast, the exhaust passages 52 of the second and third cylinders 24b, 24c are formed in the extending portion 68 of the cylinder head 26.

In a rear view (FIG. 6) of the outboard motor 5, the first and second joined flow passages 70, 71, shown in cross-section, extend generally vertically and generally parallel to each other. The first joined flow passage 70 is located closer to the cylinder 24 relative to the second joined flow passage 71. The lengths of the exhaust passages 52 (upstream side 52a+downstream side 52b) of the first and fourth cylinders 24a, 24d and the lengths of the exhaust passages 52 of the second and third cylinders 24b, 24c are approximately equal to each other. As such, the flow resistance provided by these respective flow passages is about the same.

According to the aforementioned structure, the plural joined flow passages 70, 71 are designed to join the downstream ends of the exhaust passages 52 to each other, each exhaust passage extending from the respective cylinder 24 whose ignition order is not sequential. The downstream end side of these joined flow exhaust passages 70, 71 is communicated with the expansion chamber 53.

Thus, the timings, at which exhaust gas 63 is flown from the cylinders 24 through the exhaust passages 52 into one of the joined flow passages 70, 71, differ from each other. This prevents the exhaust gas 63 pulses from interfering with each other in the joined flow passages 70, 71, resulting in excellent exhaust efficiency and accordingly improved engine power output.

As previously noted, the expansion chamber 53 can be formed in the cylinder block 25 of the engine body 14. Thus, the number of engine 11 parts can be reduced compared to the case where the expansion chamber case 50 that forms the expansion chamber 53 is provided separate from the engine body 14. Thus, the structure of the engine 11 can be more simplified.

Also, as described above, the lengths of the exhaust passages 52 are approximately equal to each other. The effects of exhaust pulsation in the exhaust passages 52 may thus be evenly and equally enhanced. This results in steady exhaust efficiency for the exhaust gas 63 from the cylinders 24, and accordingly improved engine power output.

Figure 7:
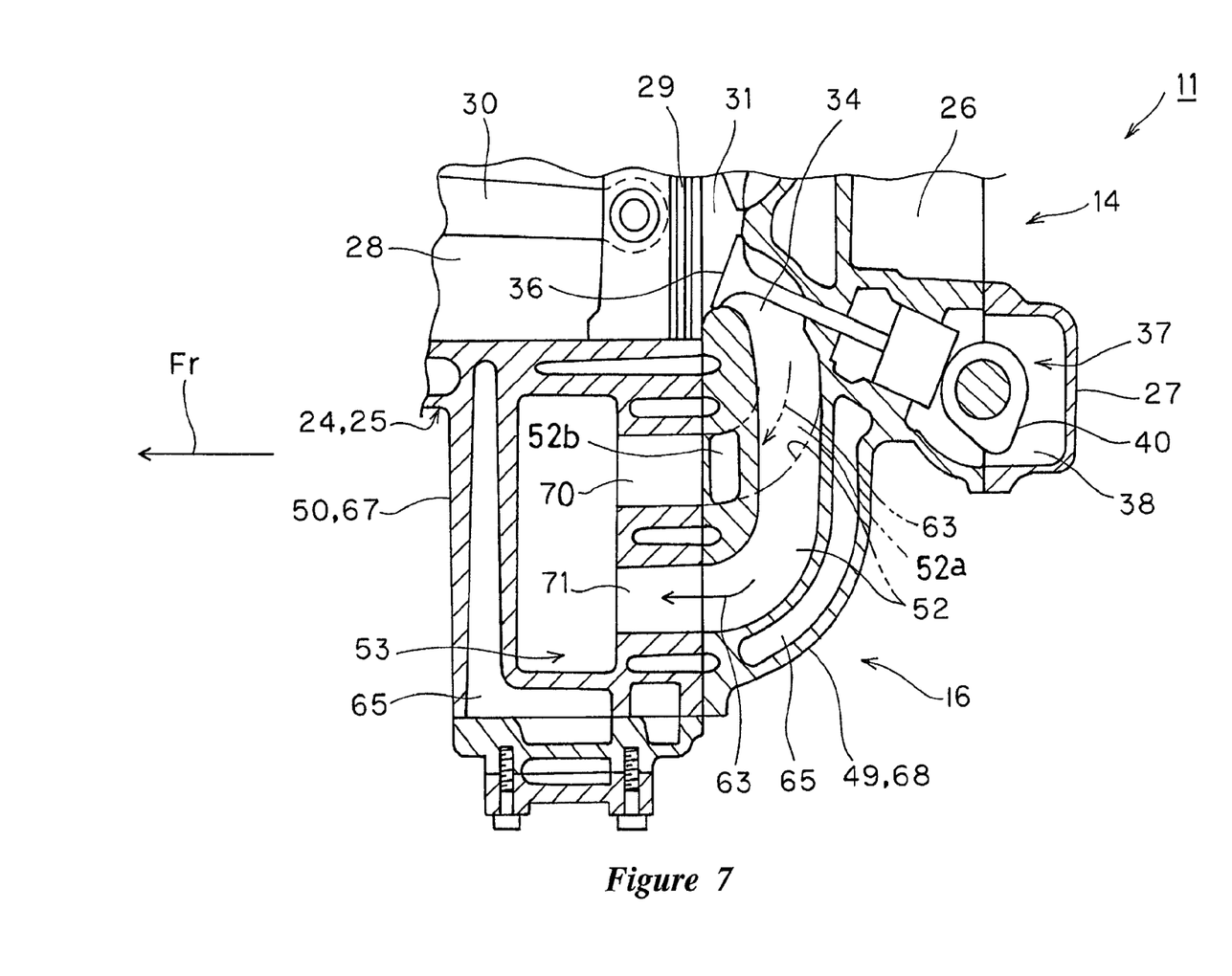
FIG. 7 is an enlarged top plan sectional view of another modification of the engine of FIG. 1.

In the modification of FIG. 7, the exhaust passages 52 (upstream side 52a+downstream side 52b) of the first and fourth cylinders 24a, 24b, as already described above, can be formed in the extending portion 68 of the cylinder head 26. The first joined flow passage 70 is formed so as to be laid across the extending portions 67, 68.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A multiple-cylinder engine for an outboard motor, comprising:
   an engine body;
   a crankcase supporting a generally vertically extending crankshaft;
   at least first, second, third, and fourth cylinders arranged generally vertically, each cylinder extending horizontally outward from the crankcase, and the first, second, third, and fourth cylinders including at least first, second, third, and fourth exhaust ports, respectively, formed in a cylinder head, the engine being configured to have a firing order such that the ignition order of first and second cylinders is not sequential and the ignition order of the third and fourth cylinders is not sequential;
   at least first, second, third, and fourth exhaust passages communicating with and extending from a downstream end of the first, second, third, and fourth exhaust ports, respectively; and
   at least first and second joined flow passages the first joined flow passage joining downstream ends of the first and second exhaust passages, the second joined flow passage joining downstream ends of the third and fourth exhaust passages;
   at least a first expansion chamber communicating with the first and second joined flow passages.

2. The multiple-cylinder engine for an outboard motor according to claim 1, wherein the first expansion chamber is formed adjacent to the first, second, third, and fourth cylinders in a plan view of the outboard motor.

3. The multiple-cylinder engine for an outboard motor according to claim 2, wherein in a plan view of the outboard motor, the engine is a V-engine having a pair of cylinder banks, and wherein the exhaust passages and the expansion chambers are both at least partly located between the banks and being both wholly located between the axes of the respective cylinder holes of the paired banks.

4. The multiple-cylinder engine for an outboard motor according to claim 3, wherein the lengths of the exhaust passages are approximately equal to each other.

5. The multiple-cylinder engine for an outboard motor according to claim 2, wherein the first expansion chamber is formed in the engine body.

6. The multiple-cylinder engine for an outboard motor according to claim 1, wherein in a plan view of the outboard motor, the engine is a V-engine having a pair of cylinder banks, and wherein the exhaust passages and the expansion chambers are both at least partly located between the banks and being both wholly located between the axes of the respective cylinder holes of the paired banks.

7. The multiple-cylinder engine for an outboard motor according to claim 6, wherein the first, second, third and fourth exhaust passages and the expansion chamber are in the form of an integral unit, and wherein the integral unit, including the exhaust passages and the first expansion chamber, is provided separate from the cylinder head and is mounted to the cylinder head.

8. The multiple-cylinder engine for an outboard motor according to claim 7, wherein in plan view of the outboard motor, the exhaust passages are bent so as to run along an external face of the protruding end of the cylinder.

9. The multiple-cylinder engine for an outboard motor according to claim 7, wherein a pair of mating faces of the cylinder head and the integral unit comprise a downstream end opening of the exhaust ports, upstream end openings of the exhaust passages in communication with the downstream end openings, the exhaust opening for communicating the first expansion chamber with the external location of the integral unit, and an upstream end opening of the additional exhaust passage formed in the cylinder head in communication with the exhaust opening, and wherein each mating face creates a flat plane.

10. The multiple-cylinder engine for an outboard motor according to claim 6, wherein in plan view of the outboard motor, the exhaust passages are bent so as to run along an external face of the protruding end of the cylinder.

11. The multiple-cylinder engine for an outboard motor according to claim 1, wherein the first expansion chamber is formed in the engine body.

12. The multiple-cylinder engine for an outboard motor according to claim 1, wherein the lengths of the exhaust passages are approximately equal to each other.

13. The multiple-cylinder engine for an outboard motor according to claim 1, wherein the lengths of the exhaust passages are approximately equal to each other.

14. A multiple-cylinder engine for an outboard motor, comprising:
an engine body;
a crankcase supporting a generally vertically extending crankshaft;
a plurality of cylinders arranged generally vertically, each cylinder extending horizontally outward from the crankcase, and each cylinder having a respective exhaust port formed in a cylinder head;
a plurality of exhaust passages, at least a portion of each passage extending generally horizontally at a position downstream from the downstream end of the exhaust port, each passage communicating with the exhaust port;
at least two joined passages each of the joined passages connecting at least two of the exhaust passages extending from two of the plurality of cylinders that are not sequentially fired; and
at least one expansion chamber communicating with the at least two joined passages.

15. The multiple-cylinder engine for an outboard motor according to claim 14, wherein the entirety of each of the exhaust passages is generally horizontal.

16. The multiple-cylinder engine for an outboard motor according to claim 14, wherein the engine body comprises a v-type Arrangement of at least first and second cylinder blocks, the plurality of cylinders being disposed in the first cylinder block, and a second plurality of cylinders being disposed in the second cylinder block.

17. The multiple-cylinder engine for an outboard motor according to claim 14, wherein the plurality of cylinders is arranged in an in-line configuration.

* * * * *